United States Patent
Nagaya et al.

(10) Patent No.: US 11,440,584 B2
(45) Date of Patent: Sep. 13, 2022

(54) AUTONOMOUS VEHICLE AND CONTROL METHOD FOR AUTONOMOUS VEHICLE

(71) Applicant: TOYOTA JIDOSHA KABUSHIKI KAISHA, Aichi-ken (JP)

(72) Inventors: Satoru Nagaya, Toyota (JP); Kazunori Ogawa, Toyota (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 73 days.

(21) Appl. No.: 16/871,049

(22) Filed: May 11, 2020

(65) Prior Publication Data
US 2020/0369318 A1 Nov. 26, 2020

(30) Foreign Application Priority Data
May 20, 2019 (JP) .............................. JP2019-094739

(51) Int. Cl.
*B62D 1/22* (2006.01)
*B60W 60/00* (2020.01)
*B62D 15/02* (2006.01)

(52) U.S. Cl.
CPC ..... *B62D 15/0205* (2013.01); *B60W 60/0011* (2020.02); *B62D 15/021* (2013.01)

(58) Field of Classification Search
CPC ... B62D 1/22; B62D 1/20; B62D 5/00; B62D 15/0205; B62D 15/02; B60W 60/00; B60W 60/0011
See application file for complete search history.

(56) References Cited

U.S. PATENT DOCUMENTS

| | | | | |
|---|---|---|---|---|
| 6,612,393 B2* | 9/2003 | Bohner | ......... | B62D 5/003 |
| | | | | 180/402 |
| 8,950,543 B2* | 2/2015 | Heo | ......... | B62D 5/04 |
| | | | | 180/444 |
| 2002/0007239 A1* | 1/2002 | Matsumoto | ......... | B62D 6/003 |
| | | | | 701/41 |
| 2005/0278096 A1* | 12/2005 | Iwazaki | ......... | B62D 15/029 |
| | | | | 701/41 |

(Continued)

FOREIGN PATENT DOCUMENTS

| | | |
|---|---|---|
| CN | 208682903 U | 4/2019 |
| JP | 2003191757 A | 7/2003 |

(Continued)

OTHER PUBLICATIONS

Extended European Search Report in EP Application No. 20172812.8, dated Oct. 14, 2020, 8pp.

*Primary Examiner* — Tan Q Nguyen
(74) *Attorney, Agent, or Firm* — Hauptman Ham, LLP (57) ABSTRACT

An autonomous vehicle includes: a steering device configured to automatically control a steering angle of tires according to a traveling condition, the steering device being provided in an accommodating room that is separated from a passenger compartment by a partition member, and the steering device including a steered shaft, an actuator, and a gear mechanism; and a joint device provided in the accommodating room, the joint device being configured to mechanically connect an input shaft and a member including a rod-shaped body that is inserted from the passenger compartment into the accommodating room through an opening and closing portion formed in the partition member.

10 Claims, 9 Drawing Sheets

(56) References Cited

U.S. PATENT DOCUMENTS

| | | | |
|---|---|---|---|
| 2008/0011537 A1* | 1/2008 | Ozsoylu | B62D 5/0424 |
| | | | 180/422 |
| 2010/0152952 A1* | 6/2010 | Lee | B62D 1/286 |
| | | | 701/31.4 |
| 2010/0318264 A1 | 12/2010 | Maeda et al. | |
| 2016/0375931 A1* | 12/2016 | Lubischer | B62D 1/183 |
| | | | 701/23 |
| 2018/0072341 A1* | 3/2018 | Schulz | F16D 3/10 |

FOREIGN PATENT DOCUMENTS

| | | |
|---|---|---|
| JP | 2003191797 A | 7/2003 |
| JP | 2008162505 A | 7/2008 |
| JP | 201743338 A | 3/2017 |
| WO | 2013080905 A1 | 6/2013 |

\* cited by examiner

AUTONOMOUS VEHICLE AND CONTROL METHOD FOR AUTONOMOUS VEHICLE

INCORPORATION BY REFERENCE

The disclosure of Japanese Patent Application No. 2019-094739 filed on May 20, 2019 including the specification, drawings and abstract is incorporated herein by reference in its entirety.

BACKGROUND

1. Technical Field

The disclosure relates to an autonomous vehicle and a control method for an autonomous vehicle.

2. Description of Related Art

Steer-by-wire steering systems capable of independently controlling steering by manual operation of a steering wheel and changing (controlling) of a steering angle of tires are known as related art.

When in a normal state, the steer-by-wire steering systems change the steering angle of the tires by electronic control with the steering wheel and a steering device separated from each other. When in an abnormal state, however, the steer-by-wire steering systems often mechanically connect the steering wheel and the steering device via a clutch and switch to electric power steering control in which a reaction force motor, etc. is used as means for applying an assist force.

In order to take advantage of the steer-by-wire technique, it is desirable for the steer-by-wire steering systems to have as much redundancy as possible even in case of a failure. For example, Japanese Unexamined Patent Application Publication No. 2017-043338 (JP 2017-043338 A) discloses a vehicle steering system including first and second control units for controlling reaction force motors, a third control unit for controlling a steering device, and a failure determination signal switching unit. Each of the first and second control units has a spare command unit capable of controlling the steering device. In case of a failure of the third control unit, the failure determination signal switching unit connects the spare command unit of the first or second control unit to the steering device.

SUMMARY

In the vehicle steering system of JP 2017-043338 A as well, when it is determined that all of the first control unit, the second control unit, and the third control unit are abnormal, a steering wheel is connected to the steering device via a clutch to switch to a manual operation. In the vehicle steering system of JP 2017-043338 A, even when the system of a vehicle is down, the steering wheel is manually operated to change the steering angle of tires. Therefore, the broken-down vehicle can be moved to a safer place by pushing with hands, etc.

Among vehicles capable of driving autonomously (hereinafter sometimes referred to as the autonomous vehicles), there are vehicles in which an operation unit (e.g., a steering wheel) that is mechanically connected to a steering device is not provided in a passenger compartment. When an abnormality (failure) occurs in an actuator or an autonomous driving system of such vehicles that controls the steering angle of tires, there is no means for changing the steering angle of the tires. Accordingly, depending on the angle of the tires at the time the failure occurs (at the time the vehicle stops), it may be difficult to move the broken-down vehicle to a safer place by pushing with hands, etc.

The disclosure provides a technique of promptly moving a broken-down vehicle to a safer place in case of a malfunction of an actuator, etc. in an autonomous vehicle in which an operation unit that is mechanically connected to a steering device is not provided in a passenger compartment.

An autonomous vehicle according to a first aspect of the disclosure includes a steering device configured to automatically control a steering angle of a tire according to a traveling condition, the steering device being provided in an accommodating room that is separated from a passenger compartment by a partition member, and the steering device including a steered shaft configured to make a linear motion to change the steering angle of the tire, an actuator configured to cause the steered shaft to make the linear motion without any operation by an occupant, and a gear mechanism configured to convert rotation of an input shaft to the linear motion of the steered shaft; and a joint device provided in the accommodating room, the joint device being configured to mechanically connect the input shaft and a member including a rod-shaped body that is inserted from the passenger compartment into the accommodating room through an opening and closing portion provided in the partition member.

In the disclosure, the term "autonomous driving" is a concept including not only fully autonomous driving that does not require any operation by an occupant but also semi-autonomous driving in which the occupant performs auxiliary operations.

According to the above aspect, the joint device that mechanically connects the rod-shaped body and the input shaft of the gear mechanism is provided in the accommodating room. Accordingly, even when an operation unit that is mechanically connected to the steering device, such as the steering wheel of the related art, is not provided in the passenger compartment, in case of a malfunction of the actuator, the steering angle of the tire can be adjusted (changed) by manual operation from the inside of the passenger compartment. That is, the steering angle of the tire can be adjusted (changed) by a simple configuration, namely by merely inserting the rod-shaped body from the passenger compartment side into the accommodating room and connecting the rod-shaped body to the joint device.

As used herein, the expression "in case of a malfunction of the actuator" includes, for example, the case where the actuator itself has failed, the case where an abnormality has occurred in an autonomous driving system, and the case where an abnormality has occurred in a tire angle sensor, etc. that is used to control the actuator.

Accordingly, the broken-down vehicle can be promptly moved to a safer place by pushing with hands, etc.

In the above aspect, an operation device that may be only electrically connected to the steering device is provided in the passenger compartment; and the operation device may be configured to control the steering angle of the tire based on an amount of operation of the operation device, which is converted to an electrical signal that is output to the actuator.

The location where the steering wheel, etc. is mounted is limited to some extent. According to the above configuration, unlike the steering wheel, etc., the location where the operation device is mounted can be more flexibly determined. Layout flexibility for the passenger compartment is thus increased.

In the above aspect, the autonomous vehicle may have the accommodating room in a front end of a vehicle body; a seat for an occupant to sit facing rearward may be provided on a passenger compartment side of the partition member; and the opening and closing portion may be located at a position below the seat or a position behind a back side of the seat.

According to the above configuration, the autonomous vehicle does not have a driver's seat in the front end of the vehicle body but instead only has the seat for an occupant to sit facing rearward in the front end of the vehicle body. This secures a larger space for occupants to use. Moreover, in case of a malfunction of the actuator, the rod-shaped body can be easily inserted into the accommodating room through the opening and closing portion that appears when, for example, the seat is removed or folded.

In the above aspect, a space for insertion of the rod-shaped body may be secured between the joint device and the opening and closing portion in the accommodating room.

According to the above configuration, since a space is secured between the joint device and the opening and closing portion, the rod-shaped body inserted into the accommodating room through the opening and closing portion can be easily and quickly connected to the gear mechanism via the joint device. The broken-down vehicle can thus be promptly moved to a safer place by pushing with hands, etc.

In the above aspect, the joint device may be supported by a frame member.

According to the above configuration, the joint device is suitably supported in the accommodating room.

In the above aspect, the joint device may include a body that is supported by the frame member independently of the steering device, a shaft portion that has a hole into which a tip end of the rod-shaped body is insertable and that is rotatably supported by the body via a ball bearing, and a universal joint that connects the shaft portion and the input shaft.

According to the above configuration, the joint device that mechanically connects the rod-shaped body and the input shaft can be easily implemented by a simple configuration using common parts such as the ball bearing and the universal joint.

Here, the frame member includes, for example, a suspension member.

In the above aspect, an operation unit that may be mechanically connected to the steering device is not provided in the passenger compartment.

In the above aspect, the operation unit may be a steering wheel.

According to the above configuration, an operation unit that is mechanically connected to the steering device, such as the steering wheel of the related art, is not provided in the passenger compartment of the autonomous vehicle. This creates a large space for occupants to use in the passenger compartment. Accordingly, the space for occupants to use is increased and the overall system redundancy need not be increased, and the broken-down vehicle can be promptly moved to a safer place by pushing with hands, etc.

In the above aspect, the rod-shaped body may be inserted into the accommodating room in case of a malfunction of the actuator.

A control method, according to a second aspect of the disclosure, for an autonomous vehicle that includes a passenger compartment and an accommodating room separated each other by a partition member includes: causing, by an actuator of a steering device provided in the accommodating room, a steered shaft of the steering device to make a linear motion without any operation by an occupant of the autonomous vehicle; changing a steering angle of a tire by the steered shaft making the linear motion; connecting an input shaft and a member including a rod-shaped body mechanically in case of a malfunction of the actuator by a joint device provided in the accommodating room, the rod-shaped body being inserted from the passenger compartment into the accommodating room through an opening and closing portion formed in the partition member; and converting, by a gear mechanism of the steering device, rotation of the input shaft in accordance with rotation of the rod-shaped body to linear motion of the steered shaft.

As described above, according to the autonomous vehicle according to the disclosure, the broken-down vehicle can be promptly moved to a safer place in case of a malfunction of the actuator, etc. even in the case where an operation unit that is mechanically connected to the steering device is not provided in the passenger compartment.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Modes for carrying out the disclosure will be described with reference to the accompanying drawings.

Overall Configuration of Vehicle

Figure 1:
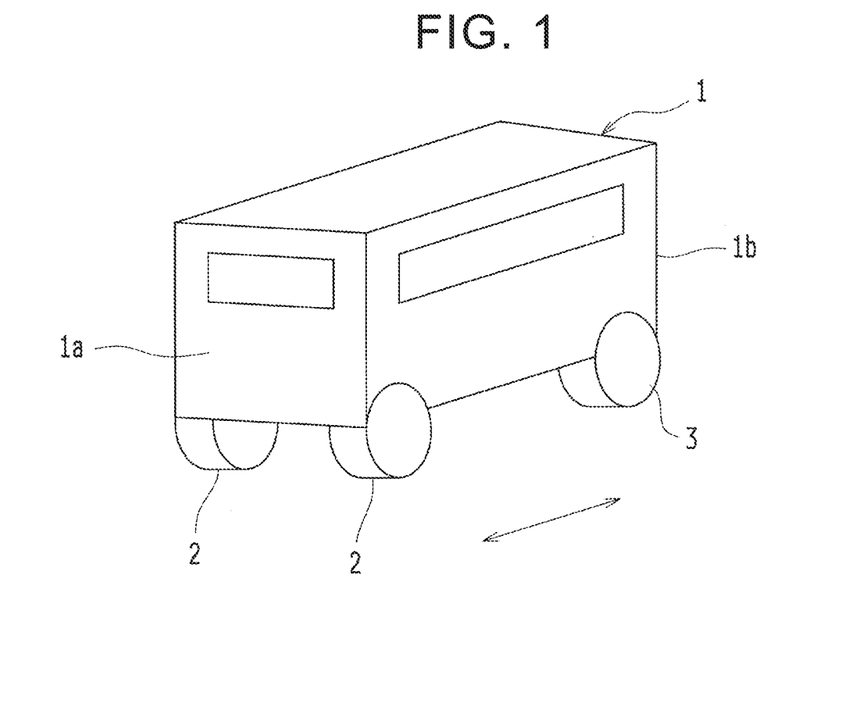
FIG. 1 is a schematic perspective view of a vehicle according to an embodiment of the disclosure.

FIG. 1 is a schematic perspective view of a vehicle 1 according to an embodiment. As shown in FIG. 1, the vehicle 1 is significantly different in appearance from common vehicles in that the vehicle 1 has a vehicle body that is substantially symmetrical in the traveling direction (see the arrow in FIG. 1), in that tires 2, 3 are disposed extremely close to both ends of the vehicle 1, and in that the vehicle 1 does not have a hood, etc. that covers an engine compartment (motor compartment), etc.

Since the vehicle 1 can travel in substantially the same manner toward both sides in the traveling direction, there is no concept of front and rear for the vehicle 1. In the following description, however, the left end of the vehicle 1 in FIG. 1 is referred to as a front end 1a (reference sign 2 indicates the front tires) and the right end of the vehicle 1 in FIG. 1 is referred to as a rear end 1b (reference sign 3 indicates the rear tires) for convenience. In the figures, arrow Fr indicates the front side in the longitudinal direction of the vehicle 1, arrow Lf indicates the left side in the lateral direction of the vehicle 1, and arrow Up indicates the upper side of the vehicle 1.

Figure 2:
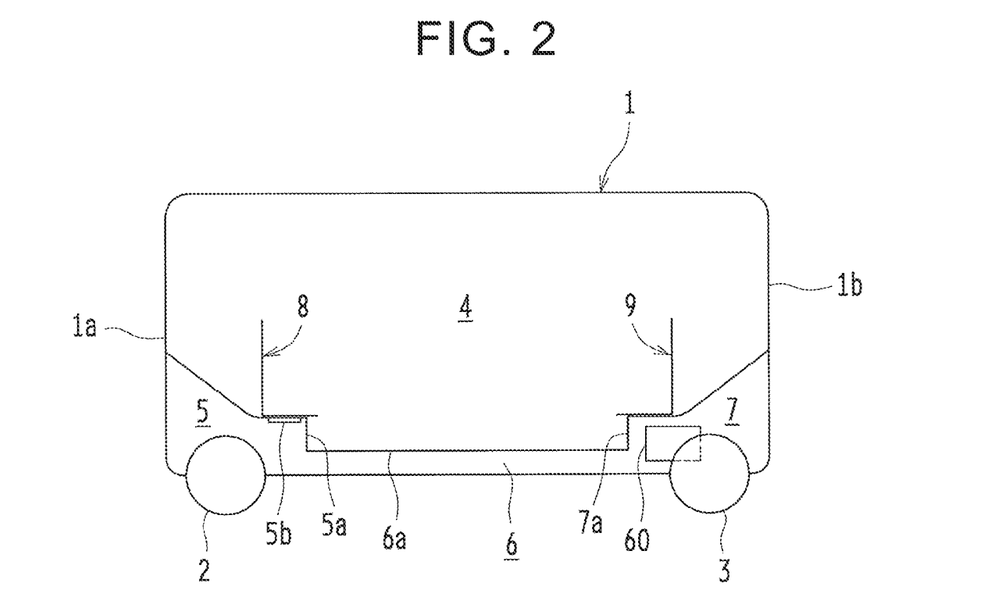
FIG. 2 is a longitudinal section schematically illustrating the inside of the vehicle.

FIG. 2 is a longitudinal section schematically illustrating the inside of the vehicle 1. The vehicle 1 is a vehicle capable of what is called "autonomous driving" (hereinafter sometimes referred to as the "autonomous vehicle") and therefore is significantly different not only in appearance but also in interior from common vehicles as shown in FIG. 2. The term "autonomous driving" is a concept including not only fully autonomous driving that does not require any operation by an occupant but also semi-autonomous driving in which the occupant performs auxiliary operations.

For example, the vehicle 1 drives autonomously as an electronic control unit (ECU) 40 (see FIG. 3) operates a driving electric motor 60, a steering actuator 20 (see FIG. 3), a brake actuator (not shown), etc. based on information from a camera 41 (see FIG. 3), a sensor 43 (see FIG. 3), a radar (not shown), a global positioning system (GPS) antenna (not shown), etc., commands transmitted from an external server via a network, etc.

The presence of what is called a "driver" is therefore not essential for the vehicle 1, and as shown in FIG. 2, operation units to be operated by the driver, such as a steering wheel mechanically connected to a steering device 11 (see FIG. 3) and a brake pedal mechanically connected to the brake actuator, are not permanently provided in a passenger compartment 4. This creates a relatively large space for occupants to use in the passenger compartment 4 of the vehicle 1. The expression "not permanently provided in the passenger compartment 4" includes not only the case where no operation unit is provided in the vehicle 1 itself but also, for example, the case where the operation units that are normally hidden in accommodating rooms 5, 7 or an underfloor space 6 appear in the passenger compartment 4 in response to, for example, operation of a button in case of an unexpected event, etc.

The vehicle 1 is configured such that it is capable of not only fully autonomous driving using the ECU 40, etc. but also semi-autonomous driving in which an operator as a supervisor riding in the passenger compartment 4 performs auxiliary operations. Specifically, a joystick (operation device) 47 (see FIG. 3) that is only electrically connected to the steering device 11 (see FIG. 3) via the ECU 40 is provided on, for example, a wall surface defining the passenger compartment 4, etc. of the vehicle 1. The steering angle of the tires 2 can also be controlled by the operator operating the joystick 47.

A system of the vehicle 1 is configured such that the operator can monitor the surroundings of the vehicle 1 using an image of the surroundings of the vehicle captured by a camera and displayed on a tablet personal computer (PC) (not shown) possessed by the operator and such that the operator can operate an emergency brake, etc. by pressing a button icon on an image displayed on the tablet PC.

The presence of this operator in the passenger compartment 4 is also not essential. For example, an operator, etc. of an external management center may play the role of the operator in the passenger compartment 4 or an external server may play a similar role.

The front accommodating room 5 accommodates the ECU 40, the steering actuator 20, the brake actuator, etc., and the rear accommodating room 7 accommodates the driving electric motor 60. As shown in FIG. 2, the vehicle 1 has the front accommodating room 5 and the rear accommodating room 7 in the front end 1a and the rear end 1b of the vehicle 1, respectively, such that the front accommodating room 5 and the rear accommodating room 7 overlap a part of the passenger compartment 4 in the longitudinal direction of the vehicle 1. Specifically, the front accommodating room 5 is separated from the passenger compartment 4 by a partition member 5a, and the rear accommodating room 7 is separated from the passenger compartment 4 by a partition member 7a. Each of the partition members 5a, 7a consists of a frame member, a panel member, etc. Accordingly, in the vehicle 1, the spaces above the front accommodating room 5 and the rear accommodating room 7 can also be used as the passenger compartment 4 (space for occupants to use). The underfloor space 6 located between the front accommodating room 5 and the rear accommodating room 7 is separated from the passenger compartment 4 by a partition member 6a. The partition member 6a consists of a frame member, a panel member, etc.

As described above, the steering wheel and the brake pedal are not permanently provided in the passenger compartment 4, and the presence of what is called a "driver's seat" is not essential for the vehicle 1. Accordingly, as shown in FIG. 2, only a front seat 8 for an occupant to sit facing rearward is provided on the passenger compartment 4 side of the partition member 5a for the front accommodating room 5. This creates more space for occupants to use in the passenger compartment 4. A rear seat 9 for an occupant to sit facing forward is provided on the partition member 7a for the rear accommodating room 7. Although not shown in the figure, a seat for an occupant to sit facing inward in the lateral direction of the vehicle 1 may be provided on the partition member 6a.

As described above, by devising the configurations, structures, and arrangement of various pieces of on-board equipment, the vehicle 1 of the present embodiment, which is significantly different from common vehicles, is implemented as a vehicle in which the proportion of the passenger compartment 4 to the entire vehicle 1 is very high (the proportion of the front and rear accommodating rooms 5, 7 accommodating the on-board equipment, etc. to the entire vehicle 1 is very low) as described above. A steering system 10, which is one of factors that contribute to implementation of such a relatively large passenger compartment 4, will be described in detail below.

Steering System

Figure 3:
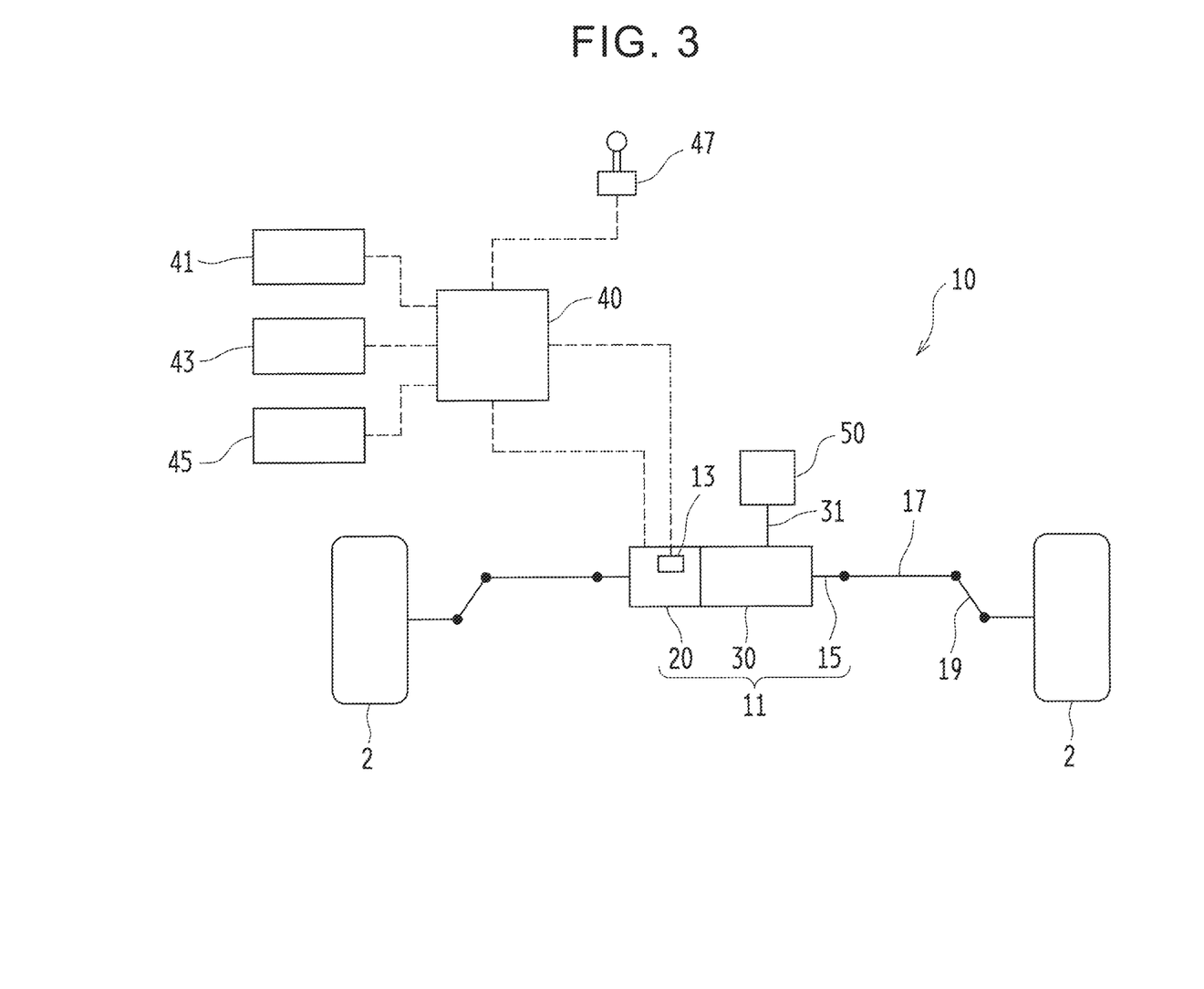
FIG. 3 is a block diagram schematically illustrating the configuration of a steering system.

FIG. 3 is a block diagram schematically illustrating the configuration of the steering system 10. As shown in FIG. 3, the steering system 10 includes the steering device 11, a tire angle sensor 13, the joystick 47, a joint device 50, and the ECU 40.

The steering device 11 includes a rack shaft (steered shaft) 15, the steering actuator 20, and a gearbox 30. The rack shaft 15 makes a linear motion in the lateral direction of the vehicle 1 to change the steering angle of the tires 2. The steering actuator 20 causes the rack shaft 15 to make the linear motion in the lateral direction of the vehicle 1 without any operation by the driver. The gearbox 30 converts rotation of an input shaft 31 into a linear motion of the rack shaft 15 in the lateral direction of the vehicle 1. The steering device 11 is configured to automatically control the steering angle of the tires 2 according to the traveling condition, based on a command from the ECU 40.

Both ends of the rack shaft 15 are connected to the tires 2 via tie rods 17 and knuckle arms 19. As the rack shaft 15 makes the linear motion in the lateral direction of the vehicle 1, the steering angle of the tires 2 is controlled (changed) according to the displacement and the direction of displacement of the rack shaft 15. The steering actuator 20 includes an electric motor (not shown) and a motion conversion mechanism (not shown) having, for example, a ball screw mechanism. The motion conversion mechanism converts rotation of the electric motor into a linear motion and transmits the linear motion to the rack shaft 15. The motion conversion mechanism also functions as a driving force transmission mechanism that transmits the driving force of the electric motor to the rack shaft 15. The gearbox 30 has, for example, a pinion and a rack. The gearbox 30 includes a motion conversion mechanism that converts rotation of the input shaft 31 into the linear motion of the rack shaft 15.

The ECU 40 is configured as a microcomputer mainly including a central processing unit (CPU) as a core component. The ECU 40 further includes a read only memory (ROM) that stores a processing program, a random access memory (RAM) that temporarily stores data, an input and output port for communication of various data, etc. in addition to the CPU. As described above, the ECU 40 receives information from the camera 41, the sensor 43, the radar, the GPS antenna, etc., and commands transmitted from the external server to a communication unit 45 via the network, etc.

The ECU 40 determines a target tire angle based on the information from the camera 41, the sensor 43, etc., and the commands from the external server, etc. by using a map, etc. stored in the ROM. The ECU 40 then generates a control signal based on the difference between an actual tire angle obtained from the tire angle sensor 13 and the target tire angle and sends the control signal to the steering actuator 20. The steering actuator 20 changes the tire angle according to the control signal. The steering angle of the tires 2 is thus automatically controlled. The gearbox 30 does not contribute at all to controlling the steering angle of the tires 2 during autonomous driving.

As described above, the joystick 47, which is provided on the wall surface defining the passenger compartment 4, etc., is configured to control the steering angle of the tire 2 based on the amount of operation of the joystick 47, which is converted to an electrical signal that is output the steering actuator 20. Specifically, the ECU 40 determines a target tire angle based on the electrical signal corresponding to the amount of operation of the joystick 47, and as in the case of the autonomous driving, sends a control signal to the steering actuator 20. In the steering system 10 of the present embodiment, the steering angle of the tires 2 can also be controlled by the operator operating the joystick 47.

The joint device 50 has a rotary shaft 55 (see FIG. 5) connected to the input shaft 31 of the gearbox 30. Accordingly, when the steering actuator 20 causes the rack shaft 15 to make the linear motion in the lateral direction of the vehicle 1 and the input shaft 31 rotates accordingly, the rotary shaft 55 of the joint device 50 rotates with the input shaft 31. The joint device 50 will be described in detail later.

Emergency Steering System

As described above, in the autonomous vehicle 1 of the present embodiment, the steering wheel mechanically connected to the steering device 11 is not provided in the passenger compartment 4. This creates a large space for occupants to use in the passenger compartment 4.

In such an autonomous vehicle 1, however, there is no means for changing the steering angle of the tires 2 in case of a malfunction of the steering actuator 20 such as in the case where the steering actuator 20 itself has failed, in the case where an abnormality has occurred in the autonomous driving system such as the ECU 40, or in the case where an abnormality has occurred in the tire angle sensor 13, etc. Accordingly, depending on the angle of the tires 2 at the time the failure occurs (at the time the vehicle stops), it may be difficult to move the broken-down vehicle 1 to a safer place by pushing with hands, etc.

Moreover, the joystick 47 is only electrically connected to the steering device 11. In other words, the joystick 47 is not mechanically connected to the steering device 11. Accordingly, the joystick 47 will not work properly in case of these failures.

The autonomous vehicle 1 according to the present embodiment therefore includes a rod-like member 70 (see FIG. 4) that is inserted from the passenger compartment 4 side into the front accommodating room 5 and connected to the gearbox 30, and the steering angle of the tires 2 can be changed by manual operation of the rod-like member 70.

Specifically, the autonomous vehicle 1 according to the present embodiment includes, as an emergency steering system, the joint device 50 and the rod-like member 70. In the autonomous vehicle 1, the joint device 50 is provided in the front accommodating room 5. In case of a malfunction of the steering actuator 20, the rod-like member 70 is inserted from the passenger compartment 4 side into the front accommodating room 5 through an opening and closing portion 5b formed in the partition member 5a, and the joint device 50 mechanically connects the rod-like member 70 and the input shaft 31 of the gearbox 30.

Figure 4:
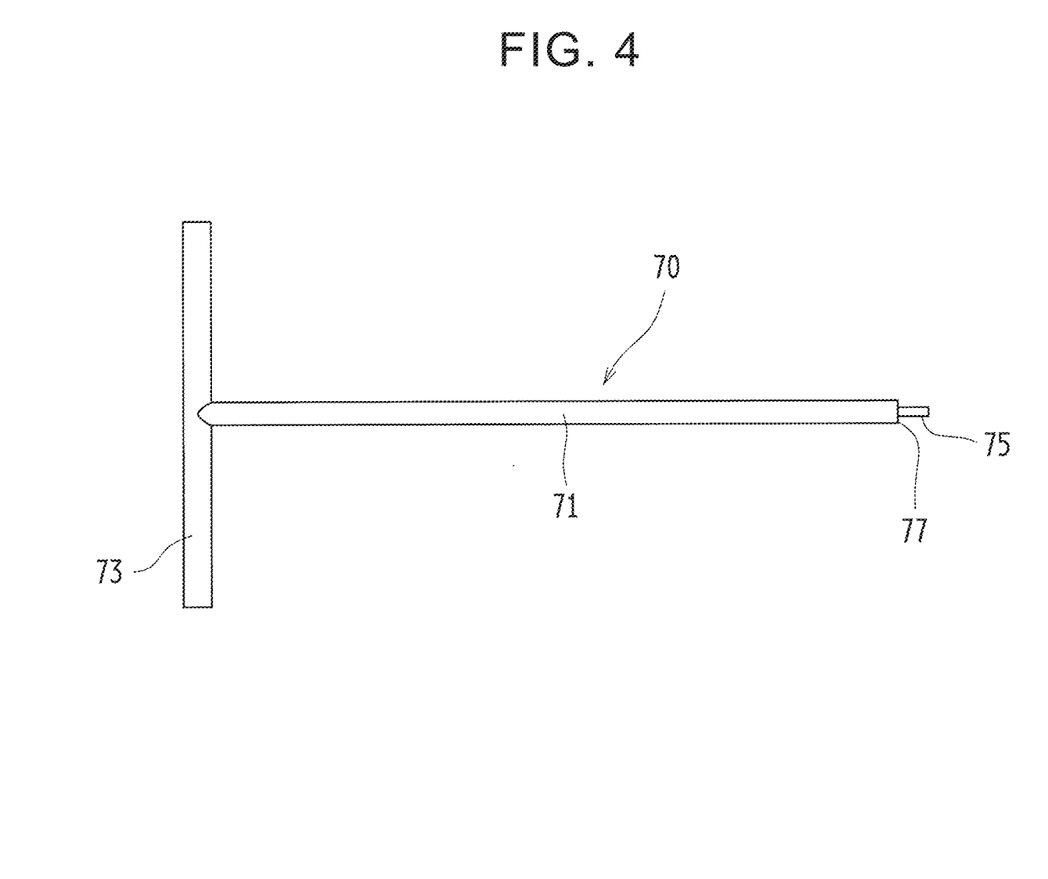
FIG. 4 schematically illustrates a rod-like member.
Figure 5:
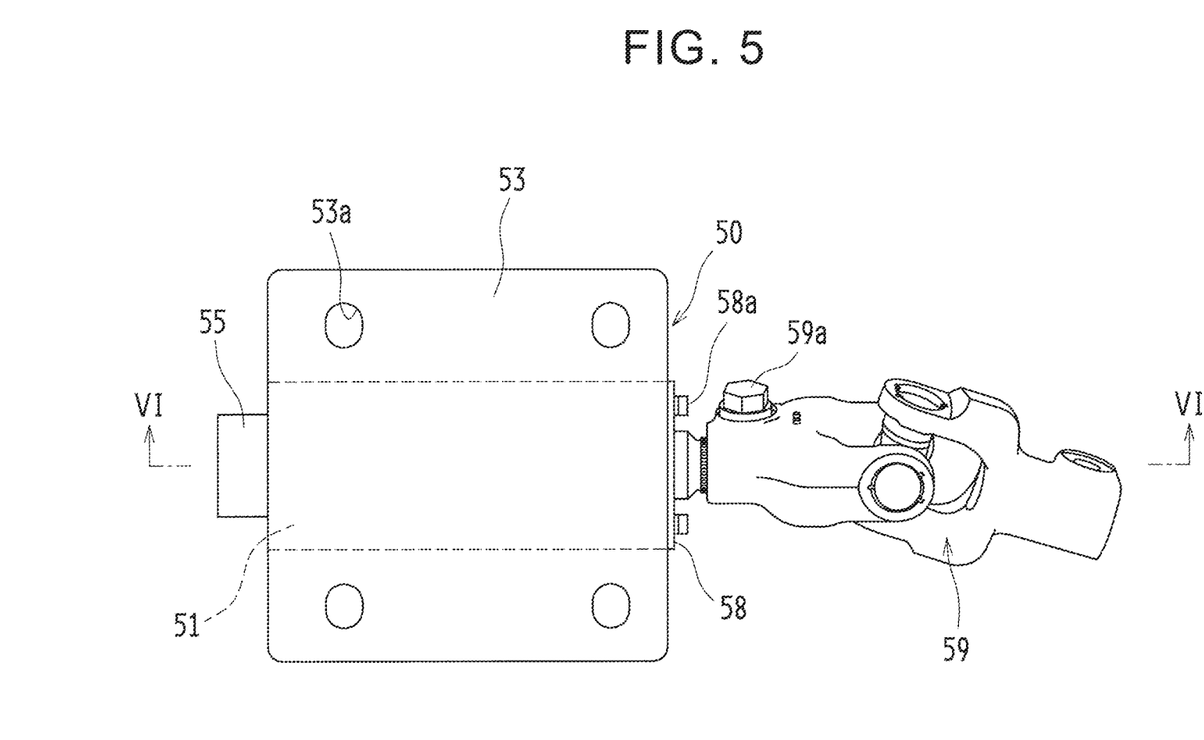
FIG. 5 schematically illustrates a joint device.
Figure 6:
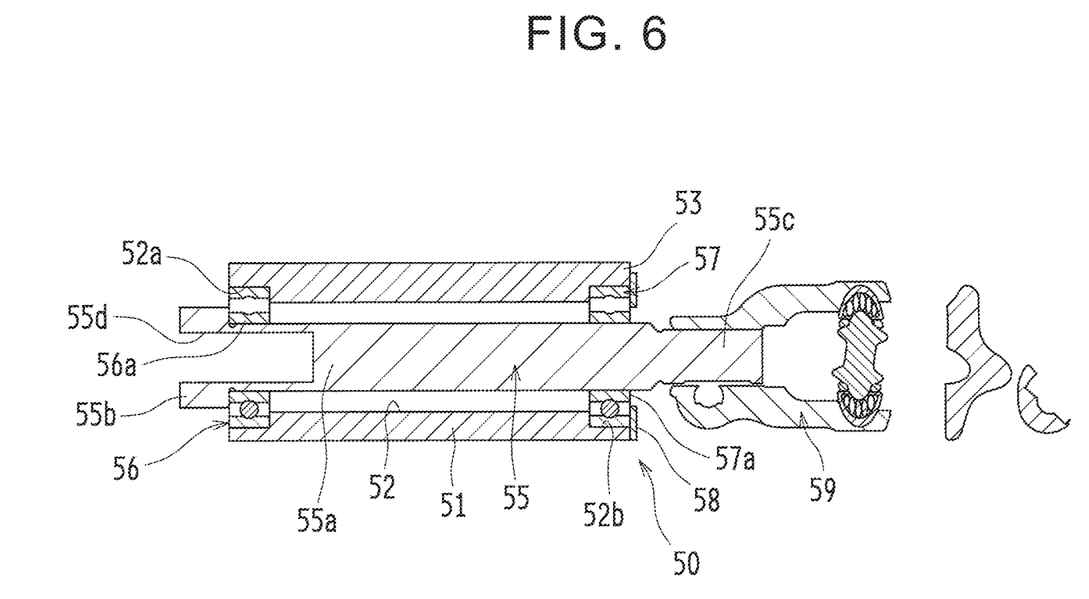
FIG. 6 is a sectional view taken along line VI-VI and viewed in the direction of arrows VI in FIG. 5.

FIG. 4 schematically illustrates the rod-like member 70, FIG. 5 schematically illustrates the joint device 50, and FIG. 6 is a sectional view taken along line VI-VI and viewed in the direction of arrows VI in FIG. 5.

Configuration of Rod-Like Member

As shown in FIG. 4, the rod-like member 70 has a cylindrical rod-like body 71, a cylindrical rod-like handle portion 73, and a rectangular rod-like connecting portion 75. The handle portion 73 is attached to one end (base end) of the body 71 and is perpendicular to the body 71. The connecting portion 75 is formed at the other end (tip end) of the body 71 via a step 77. The rod-like member 70 may be accommodated in the passenger compartment 4 or may be mounted on a rescue vehicle such as a tow truck that is sent to a location where a failure has occurred. Although the steering wheel usually has a circle shape, the rod-like member 70 according to the present embodiment is temporally used and can be used without problems in spite of its T-shape. Furthermore, it is easy to accommodate the rod-like member 70 in the passenger compartment due to its shape.

Configuration of Joint Device

As shown in FIGS. 5 and 6, the joint device 50 includes a hollow, substantially rectangular tube-like body 51, a rectangular plate-like attachment plate 53, the cylindrical rod-like rotary shaft 55, ball bearings 56, 57, a rectangular plate-like retaining plate 58, and a universal joint 59. As described below, the joint device 50 is disposed in a tilted attitude in the front accommodating room 5 with the universal joint 59 facing downward. Accordingly, in the following description, the left side of FIGS. 5 and 6 is referred to as the upper side and the right side of FIGS. 5 and 6 is referred to as the lower side for convenience.

The body 51 and the attachment plate 53 are formed integrally. As shown in FIG. 5, the attachment plate 53 has bolt holes 53a in its four corners. As shown in FIG. 6, the body 51 has a through hole 52. The body 51 has increased diameter portions 52a, 52b at the upper and lower ends of the through hole 52. The increased diameter portions 52a, 52b have a larger diameter than the through hole 52. The ball bearings 56, 57 are press-fitted in the increased diameter portions 52a, 52b, respectively. The retaining plate 58 is fastened to the lower end of the body 51 with bolts 58a so as to extend on the body 51 and the ball bearing 57. The ball bearing 57 is thus restrained from coming off from the increased diameter portion 52*b*.

The rotary shaft 55 includes a cylindrical rod-like shaft body 55*a*, a hollow cylindrical increased diameter shaft portion 55*b*, and a cylindrical rod-like joint portion 55*c*. The shaft body 55*a* has an outside diameter that is substantially the same as the bore diameter of inner races 56*a*, 57*a* of the ball bearings 56, 57. The increased diameter shaft portion 55*b* is formed on the upper side of the shaft body 55*a* and has an outside diameter larger than the outside diameter of the inner race 56*a* of the ball bearing 56. The joint portion 55*c* is formed on the lower side of the shaft body 55*a* and has a diameter smaller than that of the shaft body 55*a*. The rotary shaft 55 has an insertion hole 55*d* in its upper end. The insertion hole 55*d* has a rectangular section and is open upward. The rotary shaft 55 is inserted from above through the through hole 52 of the body 51 such that the rotary shaft 55 is rotatably supported by the body 51 via the ball bearings 56, 57.

The joint portion 55*c* of the rotary shaft 55 is inserted into a joint hole formed in the upper end of the universal joint 59 and is fastened with a bolt 59*a*. The joint portion 55*c* is thus connected to the upper end of the universal joint 59. The upper end of the input shaft 31 of the gearbox 30 is connected to the lower end of the universal joint 59 by a method similar to that for the joint portion 55*c*.

Placement of Joint Device

Figure 7:
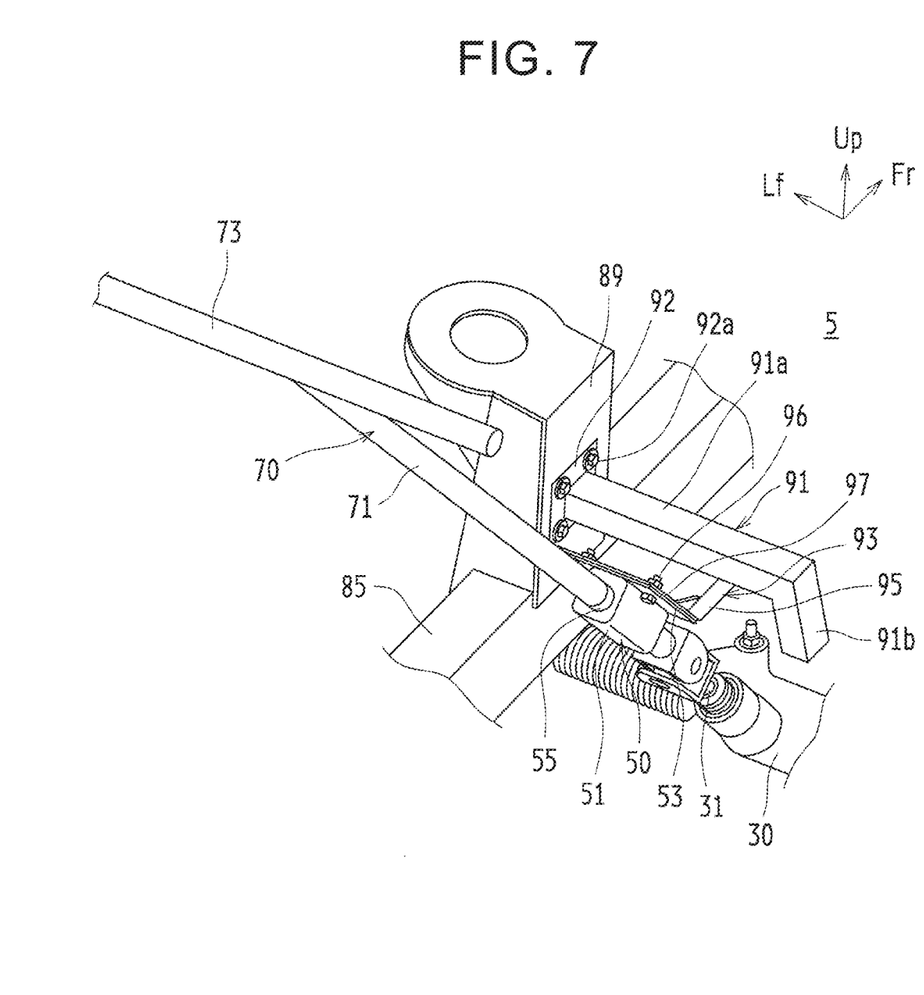
FIG. 7 is a schematic perspective view of the steering system in case of a malfunction of a steering actuator.
Figure 8:
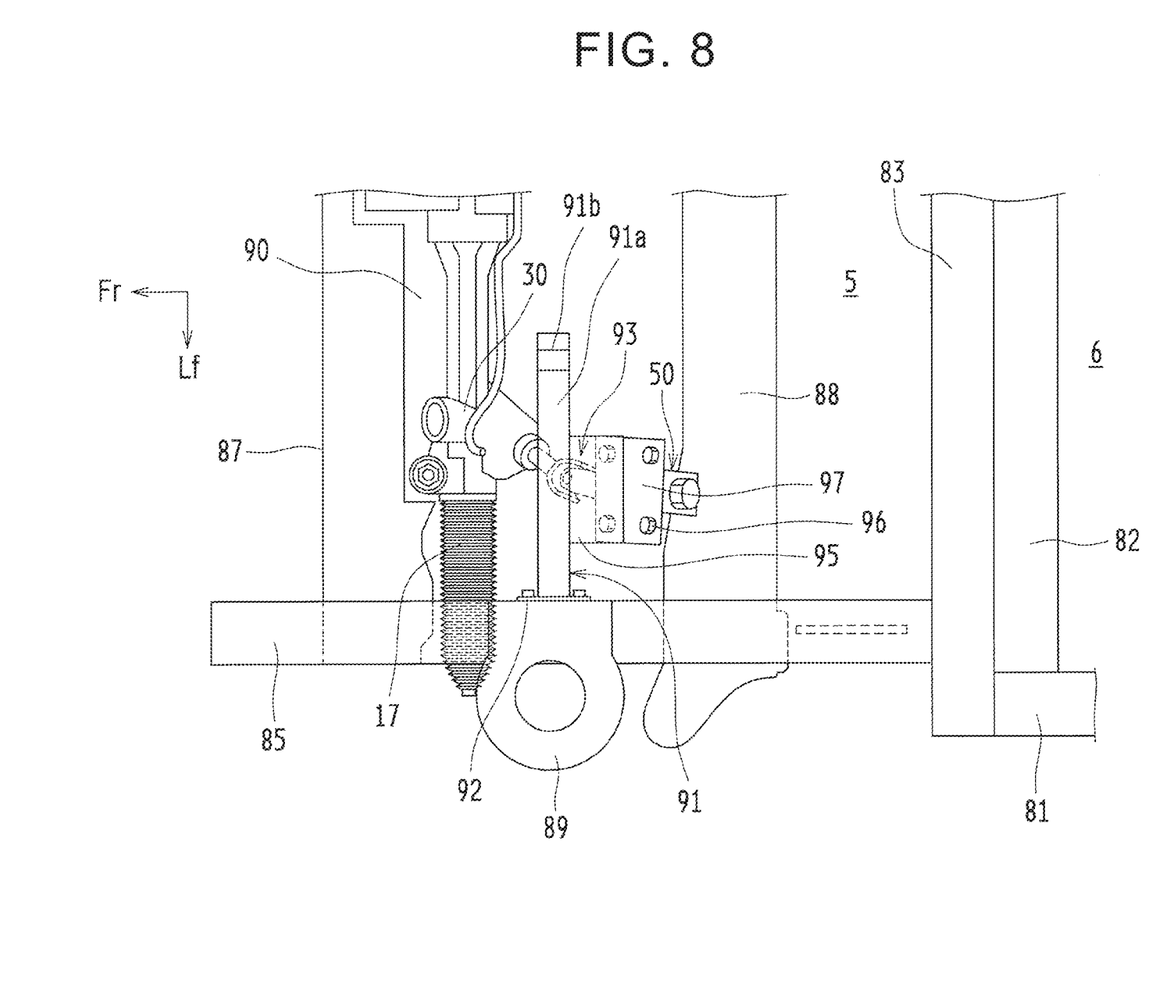
FIG. 8 is a schematic plan view of the steering system mounted on the vehicle.
Figure 9:
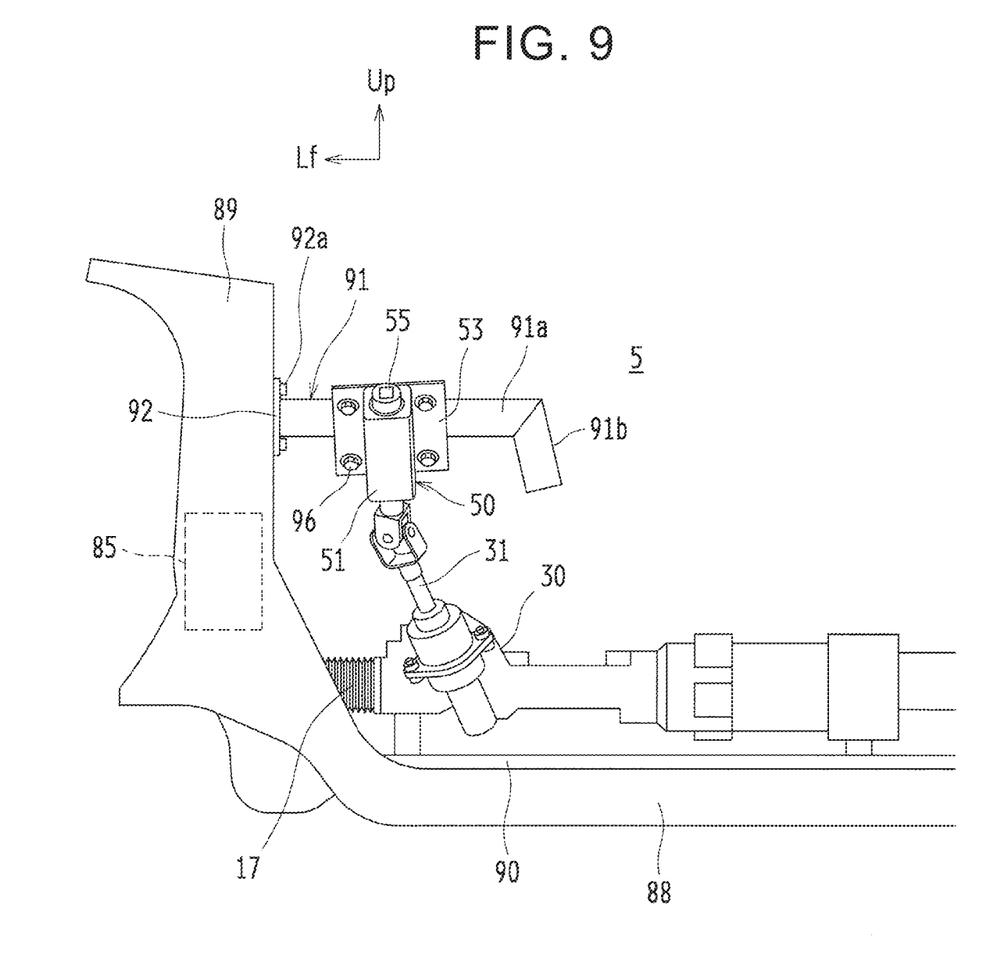
FIG. 9 is a schematic rear view of the steering system mounted on the vehicle.
Figure 10:
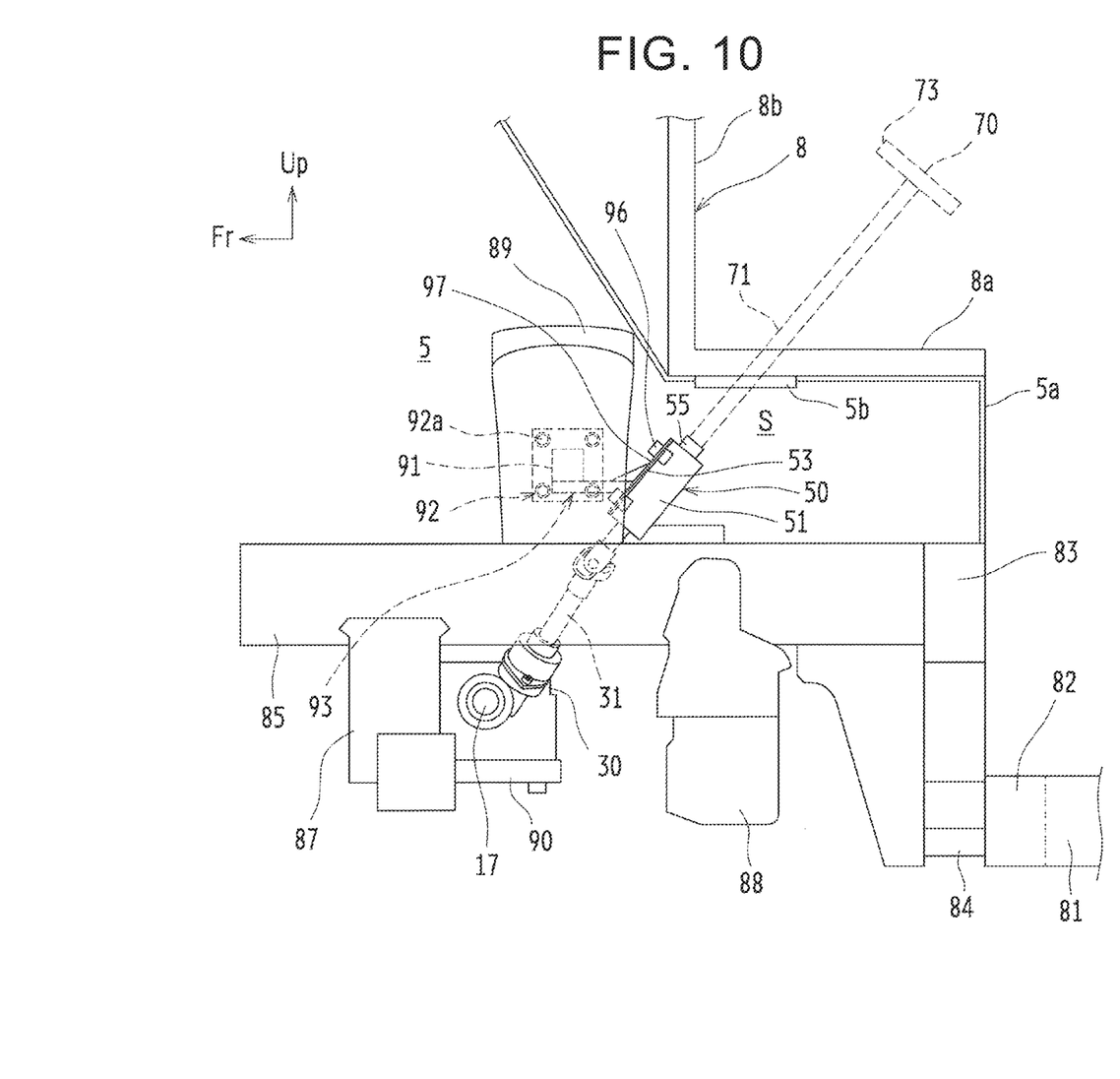
FIG. 10 is a schematic side view of the steering system mounted on the vehicle.

FIG. 7 is a schematic perspective view of the steering system 10 in case of a malfunction of the steering actuator 20. FIGS. 8 to 10 are a schematic plan view, a schematic rear view, and a schematic side view of the steering system 10 mounted on the vehicle 1, respectively. The right end of the front accommodating room 5 is not shown in FIGS. 8 and 9.

First, the configuration of the front accommodating room 5 will be briefly described. As shown in FIG. 8, a pair of side rails 81, namely right and left side rails 81, are provided in a portion corresponding to the underfloor space 6. The side rails 81 are located at respective ends in the lateral direction of the vehicle 1 and extend in the longitudinal direction of the vehicle 1. These side rails 81 are connected by a cross member 82 extending in the lateral direction of the vehicle 1. As shown in FIG. 10, an upper cross member 83 and a lower cross member 84 are disposed next to each other in the vertical direction, and the front ends of the side rails 81 are connected to the lower cross member 84. The front accommodating room 5 is formed on the front side of the cross members 83, 84 in the longitudinal direction of the vehicle 1.

Specifically, as shown in FIG. 8, a pair of side rails 85, namely right and left side rails 85, extend forward in the longitudinal direction of the vehicle 1 from both ends of the upper cross member 83 in the lateral direction of the vehicle 1. A pair of cross members 87, 88, namely front and rear cross members 87, 88, which extend in the lateral direction of the vehicle, are disposed so as to extend between the right and left side rails 85. As shown in FIG. 9, each cross member 87, 88 extends in the lateral direction of the vehicle 1, and both ends of each cross member 87, 88 are tilted upward toward the outside in the lateral direction of the vehicle 1 and are connected to the lower parts of the side rails 85. Reference sign 89 in FIGS. 7 to 10 indicates a suspension tower.

With this configuration, the right and left sides of the front accommodating room 5 are defined by the left and right side rails 85, the rear side of the front accommodating room 5 is defined by the cross member 83, and the lower side of the front accommodating room 5 is defined by the front and rear cross members 87, 88.

As shown in FIGS. 8 to 10, the front cross member 87 is provided with a bracket 90 extending rearward from the front cross member 87. The steering actuator 20 and the gearbox 30 of the steering system 10 are mounted on the bracket 90 and are thus supported by the front cross member 87. As the gearbox 30 is disposed in this manner, the upper end of the input shaft 31 extending from the gearbox 30 so as to be tilted upward toward the rear is located at substantially the same height as the middle in the height direction of the side rail 85, as shown in FIG. 10.

As shown in FIG. 9, a rectangular hollow support bracket 91 is attached to the inner surface of the suspension tower 89 in the lateral direction of the vehicle 1. The support bracket 91 is attached at a position higher than the side rail 85, and first extends substantially horizontally toward the inside (to the right) in the lateral direction of the vehicle 1 and then extends obliquely downward. More specifically, a fixing plate 92 is integrally formed at the left end of the support bracket 91 in the lateral direction of the vehicle 1, and the fixing plate 92 is fixed to the inner surface of the suspension tower 89 in the lateral direction of the vehicle 1 with bolts 92*a*. The support bracket 91 has a portion 91*a* extending substantially horizontally toward the inside in the lateral direction of the vehicle 1 and a portion 91*b* extending obliquely downward from the right end of the portion 91*a* in the lateral direction of the vehicle 1. An attachment bracket 93 for attaching the joint device 50 is attached to the portion 91*a*.

The attachment bracket 93 has a joint portion 95 and an attached plate 97. The joint portion 95 is attached to the lower surface of the portion 91*a* of the support bracket 91 and extends rearward. The attached plate 97 is attached to the rear end of the joint portion 95 and extends so as to be tilted upward toward the rear. The attached plate 97 has bolt holes (not shown) in its four corners.

The joint device 50 is attached to the attachment bracket 93 by placing the opposite surface of the attachment plate 53 from the body 51 on the rear surface of the attached plate 97 and fastening the attachment plate 53 and the attached plate 97 together with bolts 96 inserted through the bolt holes 53*a* of the attachment plate 53 and the bolt holes of the attached plate 97. As described above, the joint device 50 is supported by the suspension tower 89 via the attachment bracket 93 and the support bracket 91 independently of the gearbox 30 except that the lower end of the universal joint 59 is connected to the upper end of the input shaft 31 of the gearbox 30. As shown in FIG. 10, the joint device 50 supported by the suspension tower 89 is thus disposed in the front accommodating room 5 in such an attitude that the joint device 50 is tilted upward toward the rear such that an extension line of the rotary shaft 55 passes through a seating portion 8*a* of the front seat 8.

As shown in FIGS. 2 and 10, the partition member 5*a* of the front accommodating room 5 has the opening and closing portion 5*b* under the front seat 8 (at a position corresponding to the seating portion 8*a*). Accordingly, in case of a malfunction of the steering actuator 20, the rod-like member 70 can be inserted into the front accommodating room 5 through the opening and closing portion 5*b* as shown by dashes lines in FIG. 10 by, for example, removing or folding the front seat 8. As shown in FIG. 10, no other on-board equipment is disposed between the joint device 50 and the opening and closing portion 5b in the front accommodating room 5. A space S for insertion of the rod-like member 70 is thus secured.

When the rod-like member 70 is inserted into the front accommodating room 5 through the opening and closing portion 5b, the connecting portion 75 formed at the tip end of the rod-like member 70 is inserted into the insertion hole 55d formed in the upper end of the rotary shaft 55 of the joint device 50. As shown in FIG. 7, the rod-like member 70 is thus mechanically connected to the input shaft 31 of the gearbox 30 via the joint device 50 (the rotary shaft 55 and the universal joint 59). Since the connecting portion 75 is in the shape of a rectangular rod and the insertion hole 55d has a rectangular section, no rotation slipping will occur between the rod-like member 70 and the rotary shaft 55. The rotational force of the rod-like member 70 can thus be transmitted to the input shaft 31 by a simple configuration, namely by merely inserting the connecting portion 75 into the insertion hole 55d.

Accordingly, when the operator, etc. rotates the handle portion 73, the rotational force of the handle portion 73 is applied to the gearbox 30 via the joint device 50 and converted into the linear motion of the rack shaft 15. The steering angle of the tires 2 can thus be adjusted from the inside of the passenger compartment 4 even in case of a malfunction of the steering actuator 20. The broken-down vehicle 1 can thus be promptly moved to a safer place by pushing with hands, etc.

Functions and Effects

According to the present embodiment, the steering wheel mechanically connected to the steering device 11 is not provided in the passenger compartment 4 of the autonomous vehicle 1. This creates a large space for occupants to use.

The joint device 50 that mechanically connects the rod-like member 70 and the input shaft 31 of the gearbox 30 is provided in the front accommodating room 5. Accordingly, in case of a malfunction of the steering actuator 20, the steering angle of the tires 2 can be adjusted by manual operation from the inside of the passenger compartment 4. That is, the steering angle of the tires 2 can be adjusted by a simple configuration, namely by merely inserting the rod-like member 70 from the passenger compartment 4 side into the front accommodating room 5 and connecting the rod-like member 70 to the joint device 50.

Accordingly, the space for occupants to use is increased and the overall system redundancy need not be increased, and the broken-down vehicle 1 can be promptly moved to a safer place by pushing with hands, etc.

The joystick 47 that is only electrically connected to the steering device 11 is provided in the passenger compartment 4. The location where the steering wheel, etc. is mounted is limited to some extent. With the above configuration, unlike the steering wheel, etc., the location where the joystick 47 is mounted can be more flexibly determined. Layout flexibility for the passenger compartment 4 is thus increased.

The autonomous vehicle 1 does not have a driver's seat in the front end 1a of the vehicle body but instead only has the front seat 8 for an occupant to sit facing rearward in the front end 1a of the vehicle body. This secures a larger space for occupants to use. Moreover, in case of a malfunction of the steering actuator 20, the rod-like member 70 can be easily inserted into the front accommodating room 5 through the opening and closing portion 5b by, for example, removing or folding the front seat 8.

No other on-board equipment is disposed between the joint device 50 and the opening and closing portion 5b, and the space S for insertion of the rod-like member 70 is secured. Accordingly, the rod-like member 70 inserted into the front accommodating room 5 through the opening and closing portion 5b can be easily and quickly connected to the gearbox 30.

Other Embodiments

The disclosure is not limited to the above embodiment and can be carried out in various other forms without departing from the spirit or main features of the disclosure. For example, the disclosure can be carried out regardless of a shape of a vehicle body.

In the above embodiment, the joystick 47 is provided in the passenger compartment 4. However, the disclosure is not limited to this. For example, the steering device 11 may be operated by a tablet PC possessed by an operator, or a device for operating the steering device 11 may not be provided in the passenger compartment 4.

In the above embodiment, the opening and closing portion 5b through which the rod-like member 70 is inserted into the front accommodating room 5 is formed under the front seat 8. However, the disclosure is not limited to this. For example, the shape of the partition member 5a and the position of the front seat 8 may be changed. The opening and closing portion 5b may be formed on the back side of the front seat 8 (a position corresponding to a backrest 8b).

The steering system 10 provided in the front accommodating room 5 is described in the above embodiment. However, the disclosure is not limited to this. For example, a steering system having a similar configuration to that of the steering system 10 may further be provided in the rear accommodating room 7.

As described above, the above embodiment is merely illustrative in all aspects and should not be construed as restrictive. All modifications and alterations that fall within the equivalent scope of the claims are included in the scope of the disclosure.

According to the disclosure, a broken-down vehicle can be promptly moved to a safer place in case of a malfunction of an actuator, etc. The disclosure is therefore very useful when applied to autonomous vehicles in which an operation unit that is mechanically connected to a steering device is not provided in a passenger compartment.

What is claimed is:

1. An autonomous vehicle, comprising:
   a steering device configured to automatically control a steering angle of a tire according to a traveling condition, the steering device being provided in an accommodating room that is separated from a passenger compartment by a partition member, and the steering device including
       a steered shaft configured to make a linear motion to change the steering angle of the tire,
       an actuator configured to cause the steered shaft to make the linear motion without any operation by an occupant, and
       a gear mechanism configured to convert rotation of an input shaft to the linear motion of the steered shaft; and
   a joint device provided in the accommodating room, wherein
   the joint device is configured to mechanically connect the input shaft and a member including a rod-shaped body that is inserted from the passenger compartment into the accommodating room through an opening and closing portion provided in the partition member, and in case of a malfunction of the actuator, the rod-shaped body is inserted into the accommodating room and connected to the input shaft by the joint device.

2. The autonomous vehicle according to claim 1, further comprising:
an operation device that is only electrically connected to the steering device and is provided in the passenger compartment,
wherein the operation device is configured to control the steering angle of the tire based on an amount of operation of the operation device, which is converted to an electrical signal that is output to the actuator.

3. The autonomous vehicle according to claim 1, wherein the autonomous vehicle has
a vehicle body, the accommodating room being provided in a front end of the vehicle body; and
a seat for an occupant to sit facing rearward provided on a passenger compartment side of the partition member, and
the opening and closing portion is located at a position below the seat or a position behind a back side of the seat.

4. The autonomous vehicle according to claim 1, wherein a space for insertion of the rod-shaped body is secured between the joint device and the opening and closing portion in the accommodating room.

5. The autonomous vehicle according to claim 1, wherein the joint device is supported by a frame member.

6. The autonomous vehicle according to claim 5, wherein the joint device includes
a body that is supported by the frame member independently of the steering device,
a shaft portion that has a hole into which a tip end of the rod-shaped body is insertable and that is rotatably supported by the body via a ball bearing, and
a universal joint that connects the shaft portion and the input shaft.

7. The autonomous vehicle according to claim 1, wherein an operation unit that is mechanically connected to the steering device is not provided in the passenger compartment.

8. The autonomous vehicle according to claim 7, wherein the operation unit is a steering wheel.

9. The autonomous vehicle according to claim 1, wherein in other cases than the malfunction of the actuator, the input shaft is configured to be not connected to the rod-shaped body by the joint device and the rod-shaped body is not inserted into the accommodating room.

10. A control method for an autonomous vehicle that includes a passenger compartment and an accommodating room separated each other by a partition member, the control method comprising:
causing, by an actuator of a steering device provided in the accommodating room, a steered shaft of the steering device to make a linear motion without any operation by an occupant of the autonomous vehicle;
changing a steering angle of a tire by the steered shaft making the linear motion;
in case of a malfunction of the actuator, connecting an input shaft and a member including a rod-shaped body mechanically by a joint device provided in the accommodating room, the rod-shaped body being inserted from the passenger compartment into the accommodating room through an opening and closing portion formed in the partition member; and
converting, by a gear mechanism of the steering device, rotation of the input shaft in accordance with rotation of the rod-shaped body to linear motion of the steered shaft.

* * * * *